(12) United States Patent
Shimomura et al.

(10) Patent No.: US 7,688,184 B2
(45) Date of Patent: Mar. 30, 2010

(54) TIRE THEFT DETECTION DEVICE AND METHOD OF DETECTING TIRE THEFT

(75) Inventors: Toshio Shimomura, Chiryu (JP); Hideki Saitoh, Anjo (JP)

(73) Assignee: Denso Corporation, Kariya, Aichi-pref. (JP)

( * ) Notice: Subject to any disclaimer, the term of this patent is extended or adjusted under 35 U.S.C. 154(b) by 451 days.

(21) Appl. No.: 11/889,453

(22) Filed: Aug. 13, 2007

(65) Prior Publication Data
US 2008/0048847 A1    Feb. 28, 2008

(30) Foreign Application Priority Data
Aug. 24, 2006 (JP) ............... 2006-228372
Jun. 25, 2007 (JP) ............... 2007-166849

(51) Int. Cl.
*B60R 25/10* (2006.01)
*G08B 21/00* (2006.01)

(52) U.S. Cl. .......... 340/426.33; 340/429; 340/689; 340/686.6

(58) Field of Classification Search .......... 340/429, 340/440, 426.1, 426.11–426.36, 686.1, 687, 340/689, 686.6
See application file for complete search history.

(56) References Cited

U.S. PATENT DOCUMENTS

| 5,741,966 | A * | 4/1998 | Handfield et al. .......... 73/146.5 |
| 6,828,905 | B2 | 12/2004 | Normann et al. |
| 2006/0244577 | A1* | 11/2006 | Tanaka et al. ............... 340/429 |

FOREIGN PATENT DOCUMENTS

| JP | 04-159164 | 6/1992 |
| JP | 2002-211219 | 7/2002 |
| JP | 2003-508298 | 3/2003 |
| JP | 2004-009923 | 1/2004 |
| JP | 2004-139510 | 5/2004 |

* cited by examiner

*Primary Examiner*—Benjamin C Lee
*Assistant Examiner*—Michael Shannon
(74) *Attorney, Agent, or Firm*—Nixon & Vanderhye PC

(57) ABSTRACT

A tilt angle sensor detects a tilt angle of a vehicle and outputs a tilt angle signal indicative of the tilt angle. A tire-side communication element is disposed on a tire of the vehicle, and sends a reply signal in response to the tilt angle signal. A chassis-side communication element communicates with the tire-side communication element. A controller starts a communication between the tire-side and the chassis-side communication elements when the tilt angle signal is equal to or larger than a predetermined threshold. The controller determines that the tire is stolen when the chassis-side communication element disables to receive the reply signal from the tire-side communication element.

10 Claims, 2 Drawing Sheets

TIRE THEFT DETECTION DEVICE AND METHOD OF DETECTING TIRE THEFT

CROSS REFERENCE TO RELATED APPLICATION

This application is based on Japanese Patent Application No. 2006-228372 filed on Aug. 24, 2006 and Japanese Patent Application No. 2007-166849 filed on Jun. 25, 2007, the disclosure of which are incorporated herein by reference in its entirety.

BACKGROUND OF THE INVENTION

1. Field of the Invention

The present invention relates to a tire theft detection device for detecting a tire theft, and a method of detecting a tire theft.

2. Description of Related Art

JP-A-2002-211219 discloses a tire theft detection device. The device includes a temperature sensor, a pressure sensor, a strain sensor and an identification (ID) tag, which are disposed on an inner surface of a tire of a vehicle. Further, the device includes a communicator disposed on the inner surface of the tire. The communicator sends detection signals output from the above-described sensors, and an ID signal specific to the ID tag every predetermined time period. Furthermore, the device includes a receiver for receiving the signals sent from the communicator, and a display panel for displaying the received signals. Thus, the device always detects a state of the tire. Moreover, the device determines that the tire is stolen when the receiver is disable to receive the ID signal, and determines that the tire is not stolen when the receiver is able to receive the ID signal.

Here, communication between the communicator and the receiver has to be frequently performed in the device, because the device has to detect the theft of the tire whenever the tire is stolen. Therefore, consumption electricity may be increased.

SUMMARY OF THE INVENTION

In view of the foregoing and other problems, it is a first object of the present invention to provide a tire theft detection device. It is a second object of the present invention to provide a method of detecting a tire theft.

According to a first example of the present invention, a tire theft detection device includes a tilt angle sensor, a tire-side communication element, a chassis-side communication element and a controller. The tilt angle sensor detects a tilt angle of a vehicle and outputs a tilt angle signal indicative of the tilt angle. The tire-side communication element is disposed on a tire of the vehicle, and sends a reply signal in response to the tilt angle signal output from the tilt angle sensor. The chassis-side communication element is disposed on a chassis of the vehicle, and communicates with the tire-side communication element. The controller starts a communication between the tire-side communication element and the chassis-side communication element when the tilt angle signal is equal to or larger than a predetermined threshold. The controller determines that the tire is stolen when the chassis-side communication element disables to receive the reply signal.

According to a second example of the present invention, a tire theft detection device includes a tilt angle sensor, a tire-side communication element, a chassis-side communication element and a controller. The tilt angle sensor detects a tilt angle of a vehicle, and outputs a tilt angle signal indicative of the tilt angle. The tire-side communication element is disposed on a tire of the vehicle, and sends a reply signal in response to the tilt angle signal output from the tilt angle sensor. The chassis-side communication element is disposed on a chassis of the vehicle, and communicates with the tire-side communication element. The controller determines that the tire is stolen or not. The controller determines that the tire is stolen when the tilt angle signal is equal to or larger than a predetermined threshold. The controller starts a communication between the tire-side communication element and the chassis-side communication element when the tilt angle signal is smaller than the predetermined threshold, and determines that the tire is stolen when the chassis-side communication element disables to receive the reply signal.

According to a third example of the present invention, a method of detecting a tire theft includes detecting a tilt angle of a vehicle by a tilt angle sensor, outputting a tilt angle signal indicative of the tilt angle from a chassis-side communication element disposed on a chassis of the vehicle, sending a request signal from the chassis-side communication element to a tire-side communication element disposed on a tire of the vehicle to reply to the chassis-side communication element when the tilt angle signal is equal to or larger than a predetermined threshold, and determining that the tire is stolen when the chassis-side communication element disables to receive a reply signal from the tire-side communication element.

Accordingly, consumption electricity can be reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

Figure 1:
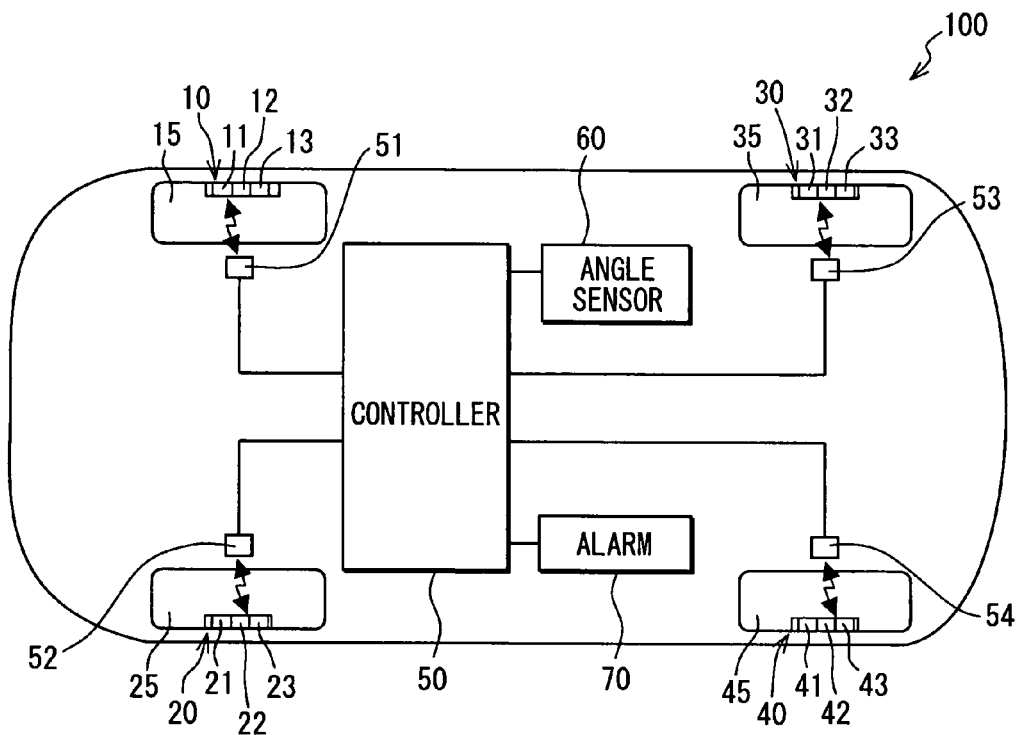
FIG. 1 is a schematic diagram showing a tire theft detection device according to an embodiment of the present invention.

A tire theft detection device 100 shown in FIG. 1 is used in a four-wheel vehicle (e.g., car, truck or bus) having a system for monitoring air pressure of a tire.

Figure 2:
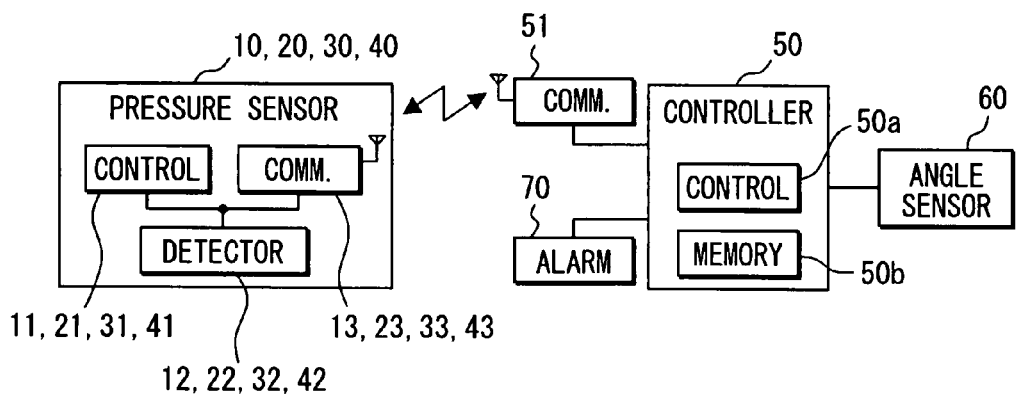
FIG. 2 is a schematic block diagram showing the tire theft detection device.

As shown in FIGS. 1 and 2, the tire theft detection device 100 includes a tire air pressure sensor unit 10, 20, 30, 40 mounted on a front/rear and left/right tire 15, 25, 35, 45, respectively. The sensor unit 10, 20, 30, 40 is constructed with an air pressure detector 12, 22, 32, 42, a tire-side communication element 13, 23, 33, 43 and a tire-side control 11, 21, 31, 41. The air pressure detector 12, 22, 32, 42 detects air pressure of the tire 15, 25, 35, 45. The tire-side communication element 13, 23, 33, 43 sends and receives electric wave. For example, the tire-side communication element 13, 23, 33, 43 sends radio frequency (RF) signal, and receives low frequency (LF) signal. The tire-side control 11, 21, 31, 41 controls the tire-side communication element 13, 23, 33, 43 to send an air pressure signal indicative of air pressure detected by the detector 12, 22, 32, 42, and an identification (ID) signal including a specific ID code.

The sensor unit 10, 20, 30, 40 is integrated with a tire valve, for example, and fitted on a disk wheel of the tire 15, 25, 35, 45. Further, the sensor unit 10, 20, 30, 40 may include a temperature detector for detecting a temperature, in addition to the air pressure detector 12, 22, 32, 42. Thereby, a variation of the tire air pressure caused by a temperature variation can be corrected when the tire air pressure is determined.

A chassis-side controller 50 is mounted on a chassis of the vehicle, and includes a control 50a, a memory 50b and the like. A chassis-side communication element 51, 52, 53, 54, a tilt angle sensor 60 and an alarm 70 are connected to the chassis-side controller 50. The control 50a of the controller 50 receives a reply signal sent from the sensor unit 10, 20, 30, 40, and monitors the air pressure of the tire 15, 25, 35, 45 based on the air pressure signal included in the reply signal. Further, the control 50a detects a theft of the tire 15, 25, 35, 45 based on a tilt angle signal output from the tilt angle sensor 60 and the communication between the chassis-side communication element 51, 52, 53, 54 and the tire-side communication element 13, 23, 33, 43. The control 50a sends a request signal to the sensor unit 10, 20, 30, 40 to reply through the communication element 51, 52, 53, 54. Thereby, the air pressure of the tire 15, 25, 35, 45 can be determined, and/or the theft of the tire 15, 25, 35, 45 can be detected.

For example, while the vehicle is traveling, the control 50a sends the request signal to the sensor unit 10, 20, 30, 40 every some seconds or some minutes, and the control 50a determines the air pressure of the tire 15, 25, 35, 45 based on the air pressure signal included in the reply signal output from the sensor unit 10, 20, 30, 40. In contrast, while the vehicle is parked, the control 50a sends the request signal to the sensor unit 10, 20, 30, 40 every dozens of minutes or some hours, and the control 50a determines the state of the air pressure of the tire 15, 25, 35, 45 based on the air pressure signal included in the reply signal output from the sensor unit 10, 20, 30, 40.

A threshold of the air pressure is stored in the memory 50b, so that the control 50a can determine the air pressure of the tire 15, 25, 35, 45 to be abnormal or not based on the threshold.

Further, a first threshold R1 and a second threshold R2 are stored in the memory 50b, relative to the tilt angle of the vehicle. The first and second thresholds R1, R2 are used for determining the theft of the tire 15, 25, 35, 45 based on a detection result of the tilt angle sensor 60, which is indicative of the tilt angle. The first threshold R1 is defined such that the control 50a determines that the tire 15, 25, 35, 45 is not stolen although the vehicle is tilted. The second threshold R2 is defined such that the control 50a determines that the tire 15, 25, 35, 45 is stolen because the vehicle is tilted. The second threshold R2 is larger than the first threshold R1.

In a case where the theft of the tire is detected based on a comparison between the detection result of the tilt angle sensor 60 and the first threshold R1, if vibration is generated to the vehicle when the vehicle is on a ferry or parked on a mobile multiple parking tower, an tire theft detection device may erroneously determine that the tire of the vehicle is stolen. However, in this embodiment, the second threshold R2 is used for detecting the theft of the tire, in order to prevent the erroneous determination. The second threshold R2 is defined to be larger than the tilt angle signal, which is output from the tilt angle sensor 60 when the above-described vibration tilts the vehicle. In contrast, the first threshold R1 is defined to be equal to or smaller than the tilt angle signal, which is output from the tilt angle sensor 60 when the above-described vibration tilts the vehicle.

The chassis-side communication element 51, 52, 53, 54 is located in a wheel house of the vehicle, and sends/receives electric wave. For example, the chassis-side communication element 51, 52, 53, 54 sends low frequency (LF) signal, and receives radio frequency (RF) signal. The chassis-side communication element 51, 52, 53, 54 treats (e.g., modulates) the reply-requesting signal output from the controller 50, and the treated signal is sent to the sensor unit 10, 20, 30, 40. Further, the chassis-side communication element 51, 52, 53, 54 treats (e.g., amplifies or demodulates) a received signal output from the sensor unit 10, 20, 30, 40, and the treated signal is sent to the controller 50.

Further, an antenna of the chassis-side communication element 51, 52, 53, 54 may be located in the wheel house of the vehicle, and the other parts, e.g., circuitry, of the chassis-side communication element 51, 52, 53, 54 may be located in the controller 50 or adjacent to the controller 50. The chassis-side communication elements 51, 52, 53, 54 respectively correspond to the sensor units 10, 20, 30, 40 in this embodiment. Alternatively, a single common communication element may be disposed in the vehicle in place of the communication elements 51, 52, 53, 54, and the controller 50 may communicate with the sensor unit 10, 20, 30, 40 through the single common communication element.

The determination result of the air pressure of the tire 15, 25, 35, 45 is displayed on a display (not shown) arranged on an instrument panel in a vehicle compartment of the vehicle. The display includes a warning lamp, e.g., LED. For example, when the tire air pressure is equal to or lower than a predetermined value, the controller 50 determines the tire air pressure to be abnormal, so that the warning lamp is lighted up. Thus, the abnormality of the tire air pressure is indicated to an occupant, e.g., driver, of the vehicle.

Further, the controller 50 may include an external input terminal (not shown) connectable to a bar-code reader. As described above, the ID code is respectively given to the sensor unit 10, 20, 30, 40. When the bar-code reader is connected to the controller 50, the bar-code reader reads a bar-code corresponding to the ID code, and inputs the read signal into the controller 50. Thereby, the ID code can be input into the controller 50. Alternatively, the ID code may be input into the controller 50 through a keyboard (not shown), for example.

Any sensor capable of detecting the tilt angle of the vehicle may be used as the tilt angle sensor 60 without departing from the scope of the present disclosure. For example, an acceleration sensor for detecting gravity acceleration, or a pendulum type sensor may be used as the tilt angle sensor 60. A piezoresistance type acceleration sensor, an electrostatic capacity type acceleration sensor and a magnetic type acceleration sensor are known as the acceleration sensor, and may be used as the tilt angle sensor 60. However, a signal output from the piezoresistance type acceleration sensor may be affected by a temperature due to a temperature characteristic of a resistor of the sensor. Further, a signal output from the electrostatic capacity type acceleration sensor may be affected by a temperature due to a temperature characteristic of a sealant gas of the sensor. In these cases, temperature correction may be performed. The tilt angle sensor 60 detects the tilt angle of the vehicle, and outputs a tilt angle signal indicative of the tilt angle.

The alarm 70 includes a speaker, for example, and outputs an alarm, e.g., buzzer, sound or voice, in response to an instruction output from the control 50a of the controller 50. When the alarm is raised from the alarm 70, a user of the vehicle can know that the tire is stolen. Further, the alarm can make a thief to give up stealing the tire.

Figure 3:
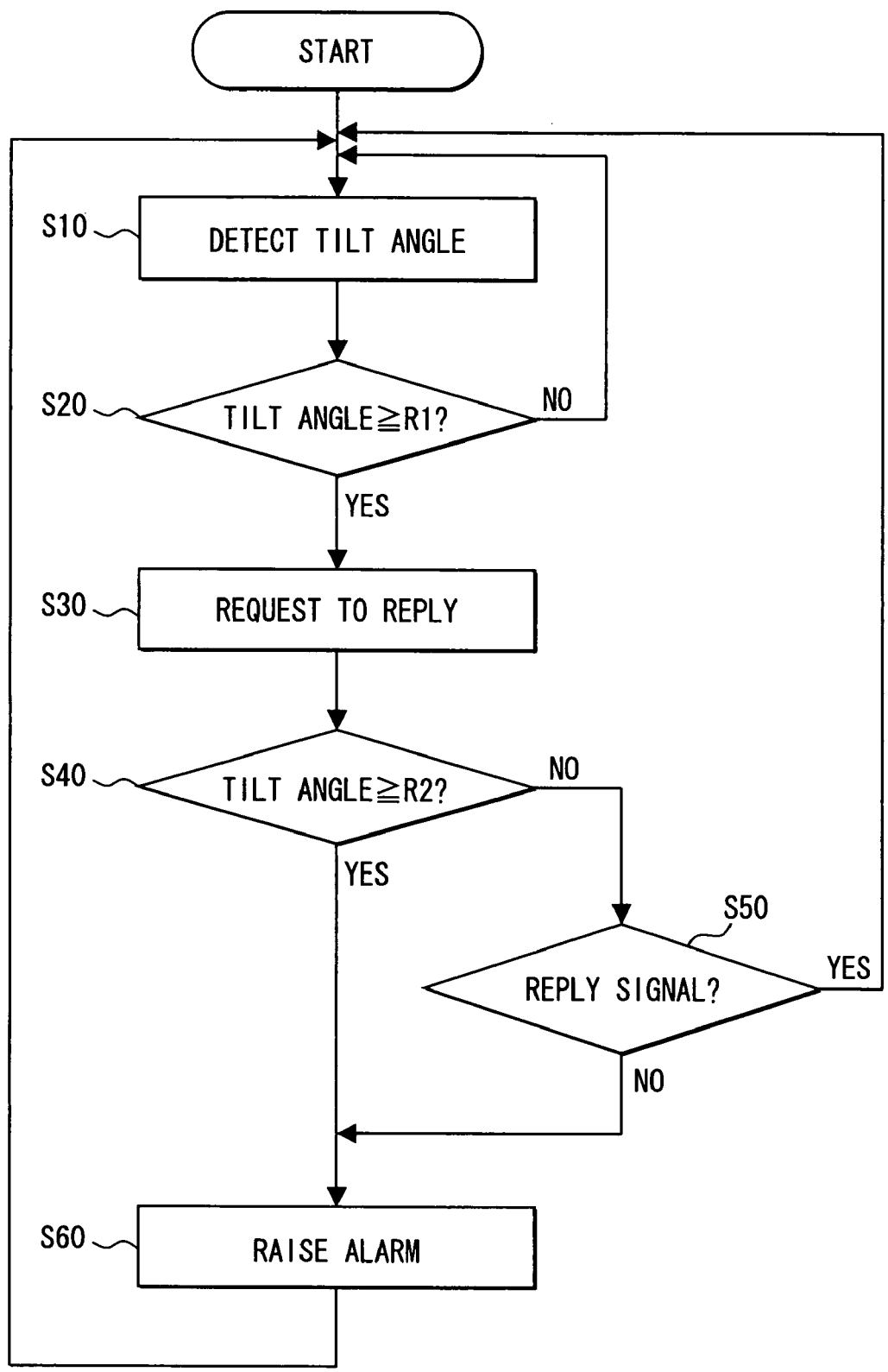
FIG. 3 is a flow chart showing operation of the tire theft detection device.

Here, operation of the tire theft detection device 100 will be described with reference to FIG. 3. The flow chart shown in FIG. 3 starts after a predetermined period passes since an engine of the vehicle is turned off. During the predetermined period, the occupant of the vehicle gets out of the vehicle, and closes a door of the vehicle. Further, the flow chart shown in FIG. 3 is repeatedly performed every predetermined period until the engine is turned on again.

At step S10, the control 50a outputs a signal to the tilt angle sensor 60 to start detecting the tilt angle of the vehicle.

At step S20, the control 50a determines the detection result of S10, i.e., tilt angle signal output from the tilt angle sensor 60, to be equal to or larger than the first threshold R1 or not. When the control 50a determines the detection result of S10 to be equal to or larger than the first threshold R1 (YES at S20), the control 50a proceeds to S30. When the control 50a determines the detection result of S10 to be smaller than the first threshold R1 (NO at S20), the control 50a returns to S10. The first threshold R1 is used for determining to start the communication or not between the chassis-side communication element 51, 52, 53, 54 and the tire-side communication element 13, 23, 33, 43 of the sensor unit 10, 20, 30, 40. The communication between the chassis-side communication element 51, 52, 53, 54 and the tire-side communication element 13, 23, 33, 43 is started when the tilt angle signal is equal to or larger than the first threshold R1.

At step S30, the control 50a sends the request signal to the tire-side communication element 13, 23, 33, 43 of the sensor unit 10, 20, 30, 40 to reply through the chassis-side communication element 51, 52, 53, 54, in order to detect the theft of the tire. Thus, the control 50a starts the communication with the sensor unit 10, 20, 30, 40. The control 11, 21, 31, 41 of the sensor unit 10, 20, 30, 40 receives the request signal, and sends the air pressure signal indicative of the air pressure detected by the detector 12, 22, 32, 42 and the reply signal including the ID code through the tire-side communication element 13, 23, 33, 43.

At step S40, the control 50a determines the detection result of S10, i.e., tilt angle signal output from the tilt angle sensor 60, to be equal to or larger than the second threshold R2 or not. When the control 50a determines the detection result of S10 to be equal to or larger than the second threshold R2 (YES at S40), the control 50a proceeds to S60. When the control 50a determines the detection result of S10 to be smaller than the second threshold R2 (NO at S40), the control 50a proceeds to S50.

At step S60, the control 50a controls the alarm 70 to output an alarm indicative of the theft of the tire by using the buzzer, sound or voice.

In contrast, step S50 is performed only when the tilt angle signal is equal to or lager than the first threshold R1 and smaller than the second threshold R2. In this case, the tire may be stolen, because the vehicle is tilted. Therefore, at step S50, the control 50a determines the reply signal to be sent or not from the tire-side communication element 13, 23, 33, 43 of the sensor unit 10, 20, 30, 40, relative to the request signal sent at step S30.

When the control 50a determines the sensor unit 10, 20, 30, 40 to send the reply signal (YES at S50), the control 50a returns to S10. When the control 50a determines the sensor unit 10, 20, 30, 40 not to send the reply signal (NO at S50), the control 50a proceeds to S60. That is, when the reply signal is not sent relative to the request signal, the tire is determined to exist outside of a communication area of the communication element 51, 52, 53, 54, because the tire is stolen. Therefore, in this case, the control 50a outputs the alarm indicative of the theft of the tire through the alarm 70 with buzzer, sound or voice.

Here, whenever the tire is stolen, the theft of the tire has to be detected based on the communication between the chassis-side communication element 51, 52, 53, 54 and the tire-side communication element 13, 23, 33, 43 of the sensor unit 10, 20, 30, 40. Therefore, the communication has to be performed always or intermittently with a relatively short interval. However, in this embodiment, the communication is started only after the tilt angle signal becomes equal to or larger than the first threshold R1, so that consumption electricity generated by the communication can be reduced.

Further, even if sensitivity for detecting the theft of the tire by the tilt angle sensor 60 is lowered in order to prevent an erroneous determination, the theft of the tire can be detected when the tilt angle signal becomes equal to or larger than the second threshold R2. Furthermore, even if the tilt angle signal is smaller than the second threshold R2, the theft of the tire can be detected based on the communication between the chassis-side communication element 51, 52, 53, 54 and the communication element 13, 23, 33, 43 when the tilt angle signal is equal to or larger than the first threshold R1. Thus, detection accuracy can be increased.

Further, because the reply signal output from the sensor unit 10, 20, 30, 40 includes the ID code specific to each tire 15, 25, 35, 45, the control 50a can distinguish which tire is stolen.

In this embodiment, the control 50a starts communicating with the sensor unit 10, 20, 30, 40 to detect the theft of the tire, when the tilt angle signal is equal to or larger than the first threshold R1. However, any condition may be used for starting the communication between the control 50a and the sensor unit 10, 20, 30, 40 without departing from the scope of the present disclosure. For example, when the tilt angle signal output from the tilt angle sensor 60 indicates a slight tilt of the vehicle, the control 50a may start communicating with the sensor unit 10, 20, 30, 40 to detect the theft of the tire. That is, the control 50a may start communicating with the sensor unit 10, 20, 30, 40 to detect the theft of the tire, when the tilt angle sensor 60 replies to the control 50a.

In this embodiment, the tire theft detection device 100 is used in the four-wheel vehicle having the system for monitoring the air pressure of the tire. Therefore, production cost of the device 100 can be restricted from increasing, because an additional device is not needed for the device 100. However, the tire theft detection device 100 may be used in a four-wheel vehicle not having the system for monitoring the air pressure of the tire.

For example, the tire theft detection device 100 includes the tilt angle sensor 60, the tire-side communication element 13, 23, 33, 43, the chassis-side communication element 51, 52, 53, 54 and the controller 50. The tilt angle sensor 60 detects the tilt angle of the vehicle, and outputs the tilt angle signal indicative of the tilt angle. The tire-side communication element 13, 23, 33, 43 is disposed on the tire 15, 25, 35, 45, and sends the reply signal based on the tilt angle signal. The chassis-side communication element 51, 52, 53, 54 communicates with the tire-side communication element 13, 23, 33, 43. The controller 50 determines that the tire is stolen when the tilt angle signal becomes equal to or larger than the second threshold R2.

Further, the controller 50 starts the communication between the chassis-side communication element 51, 52, 53, 54 and the tire-side communication element 13, 23, 33, 43 when the tilt angle signal is smaller than the second threshold R2. The controller 50 determines that the tire is stolen, when the chassis-side communication element 51, 52, 53, 54 disables to receive the reply signal from the tire-side communication element 13, 23, 33, 43. According to this tire theft detection device 100, the theft of the tire can be detected, even if the device 100 does not have the system for monitoring the tire air pressure.

Further, at the above-described step S30, when the communication between the control 50a and the sensor unit 10, 20, 30, 40 is started to detect the theft of the tire, the communication may be intermittently performed with a predetermined interval. Thus, consumption electricity can be more reduced.

Further, at the above-described step S30, when the communication between the control 50a and the sensor unit 10, 20, 30, 40 is started to detect the theft of the tire, the communication may be performed for a predetermined period since the tilt angle signal is output from the tilt angle sensor 60. The theft of the tire usually takes only some seconds or some minutes. Therefore, the communication is to be performed to detect the theft of the tire only while the tire is being stolen. Thus, consumption electricity can be more reduced.

Further, at the above-described step S30, when the communication between the control 50a and the sensor unit 10, 20, 30, 40 is started to detect the theft of the tire, the communication may be performed only while the tilt angle signal is output from the tilt angle sensor 60. Thereby, the communication is performed only while the vehicle is tilted. Thus, consumption electricity can be more reduced.

Further, the chassis-side communication elements 51, 52, 53, 54 may be integrated into a single common chassis-side communication element. The single common chassis-side communication element may be located such that distances between the tire-side communication elements 13, 23, 33, 43 and the single common chassis-side communication element are different from each other. Thereby, communication time period between the single common chassis-side communication element and the communication elements 13, 23, 33, 43 can be made different, so that the control 50a can distinguish which tire is stolen. That is, even after a tire rotation is performed, the control 50a can distinguish which tire is stolen.

In this embodiment, the controller 50 determines that the tire is stolen, when the tilt angle signal is equal to or larger than the second predetermined threshold R2. However, the controller 50 may determine that the tire is stolen when the chassis-side communication element 51, 52, 53, 54 disables to receive the reply signal from the tire-side communication element 13, 23, 33, 43, after starting the communication between the chassis-side communication element 51, 52, 53, 54 and the tire-side communication element 13, 23, 33, 43 when the tilt angle signal is equal to or larger than a predetermined threshold. Description of this case will be approximately similar to the above-description, so that detailed description of this case will be omitted.

That is, the tilt angle signal output from the tilt angle sensor 60 may be used only as a trigger for starting the communication between the chassis-side communication element 51, 52, 53, 54 and the tire-side communication element 13, 23, 33, 43. In other words, the tilt angle signal output from the tilt angle sensor 60 is used only as a trigger for determining to perform the detection of the theft of the tire or not.

In this case, because the communication between the chassis-side communication element 51, 52, 53, 54 and the tire-side communication element 13, 23, 33, 43 is started when the tilt angle signal becomes equal to or lager than the predetermined threshold, communication frequency between the chassis-side communication element 51, 52, 53, 54 and the tire-side communication element 13, 23, 33, 43 can be reduced. Thus, consumption electricity can be reduced.

These modifications may be singly performed. Further, the embodiment and the modifications may be combined. Such changes and modifications are to be understood as being within the scope of the present invention as defined by the appended claims.

What is claimed is:

1. A tire theft detection device comprising:
   a tilt angle sensor for detecting a tilt angle of a vehicle and outputting a tilt angle signal indicative of the tilt angle;
   a chassis-side communication element disposed on a chassis of the vehicle, the chassis-side communication element communicating with a tire-side communication element responsive to the tilt angle signal output from the tilt angle sensor;
   the tire-side communication element disposed on a tire of the vehicle, the tire-side communication element sending a reply signal in response to the communication from the chassis-side communication element; and
   a controller for starting the communication between the tire-side communication element and the chassis-side communication element when the tilt angle signal is equal to or larger than a predetermined threshold, wherein
   the controller determines that the tire is stolen when the chassis-side communication element is unable to receive the reply signal.

2. A tire theft detection device comprising:
   a tilt angle sensor for detecting a tilt angle of a vehicle and outputting a tilt angle signal indicative of the tilt angle;
   a chassis-side communication element disposed on a chassis of the vehicle, the chassis-side communication element communicating with a tire-side communication element responsive to the tilt angle signal output from the tilt angle sensor;
   the tire-side communication element disposed on a tire of the vehicle, the tire-side communication element sending a reply signal in response to the communication from the chassis-side communication element; and
   a controller for determining that the tire is stolen when the tilt angle signal is equal to or larger than a predetermined threshold, wherein
   the controller starts the communication between the tire-side communication element and the chassis-side communication element when the tilt angle signal is smaller than the predetermined threshold, and determines that the tire is stolen when the chassis-side communication element is unable to receive the reply signal.

3. The tire theft detection device according to claim 1, wherein
   the controller causes the communication between the tire-side communication element and the chassis-side communication element for a predetermined period after the tilt angle sensor outputs the tilt angle signal.

4. The tire theft detection device according to claim 1, wherein
   the controller causes the communication between the tire-side communication element and the chassis-side communication element while the tilt angle sensor outputs the tilt angle signal.

5. The tire theft detection device according to claim 1, further comprising:
   a memory for memorizing an identification code given to the tire, wherein
   the tire-side communication element sends the reply signal, which includes the identification code.

6. The tire theft detection device according to claim 1, wherein
   the tire is one of a plurality of tires,
   the tire-side communication element is arranged on each of the plurality of tires, and the chassis-side communication element is located such that distances between the chassis-side communication element and the tire-side communication elements are different from each other.

7. The tire theft detection device according to claim 1, further comprising:
an alarm for raising an alarm of a theft of the tire when the controller determines that the tire is stolen.

8. The tire theft detection device according to claim 1, wherein
the vehicle includes a tire air pressure sensor for detecting an air pressure of the tire and outputting an air pressure signal indicative of the air pressure, and
the tire-side communication element uses the air pressure signal as the reply signal.

9. A method of detecting a tire theft comprising:
detecting a tilt angle of a vehicle by a tilt angle sensor;
outputting a tilt angle signal indicative of the tilt angle from a chassis-side communication element disposed on a chassis of the vehicle;
sending a request signal from the chassis-side communication element to a tire-side communication element disposed on a tire of the vehicle to request a reply to the chassis-side communication element when the tilt angle signal is equal to or larger than a first predetermined threshold; and
determining that the tire is stolen when the chassis-side communication is unable disables to receive a reply signal from the tire-side communication element.

10. The method according to claim 9, further comprising:
determining that the tire is stolen when the tilt angle signal is equal to or larger than a second predetermined threshold larger than the first predetermined threshold.

* * * * *